United States Patent [19]

Mooney et al.

[11] Patent Number: 4,934,403
[45] Date of Patent: Jun. 19, 1990

[54] READILY INSPECTABLE AND CLEANABLE EMERGENCY VALVE FOR STORAGE TANK

[75] Inventors: Thomas E. Mooney; Frank H. Petersen, both of Warren, Pa.

[73] Assignee: Betts Industries, Inc., Warren, Pa.

[21] Appl. No.: 355,720

[22] Filed: Apr. 10, 1989

[51] Int. Cl.⁵ .............................................. F16K 43/00
[52] U.S. Cl. ...................... 137/315; 251/14; 251/63.5; 251/144; 251/214; 251/278; 137/556
[58] Field of Search .................. 137/315, 556; 251/62, 251/63, 63.4, 63.5, 63.6, 144, 264, 277, 278, 214, 14

[56] References Cited

U.S. PATENT DOCUMENTS

| | | | |
|---|---|---|---|
| 3,065,949 | 11/1962 | DeFrees | 261/62 |
| 3,378,224 | 4/1968 | Boyle | 251/14 |
| 3,415,486 | 12/1968 | DeFrees | 251/144 |
| 3,765,642 | 10/1973 | Nelson | 251/14 |
| 3,842,854 | 10/1974 | Wicke | 251/14 |
| 3,910,551 | 10/1975 | DeFrees | 251/144 |
| 4,234,010 | 11/1980 | Jenkins et al. | 251/144 |

FOREIGN PATENT DOCUMENTS

| | | | |
|---|---|---|---|
| 654916 | 1/1963 | Canada | 251/16 |
| 654932 | 1/1963 | Canada | 137/27 |
| 684134 | 4/1964 | Canada | 251/16 |
| 1016147 | 8/1977 | Canada | 251/13 |
| 2343069 | 2/1975 | Fed. Rep. of Germany | 251/144 |

OTHER PUBLICATIONS

Betts Industries, Inc.—Prior Art Emergency Valve, per Attached Engineering Drawings Entitled Exhibits A, B, C and D, respectively, Drawings Dated 1986 and 1987.

*Primary Examiner*—George L. Walton
*Attorney, Agent, or Firm*—Baldwin, Egan & Fetzer

[57] ABSTRACT

An emergency valve assembly for a tank adapted to contain liquid such as for instance hazardous material, with the valve assembly including a valve head for closing the discharge port from the tank in an operative closed position of the valve head, and with a first operating unit coacting with the valve head for selectively opening the latter and a separate second operating unit coacting with the valve head for automatically closing the latter. The first operating unit has a portion adapted for accessibility from exteriorly of the tank and includes a fluid power connection to the first operating unit, for selectively supplying pressurized fluid to such operating unit; for causing opening of the valve head via such operating unit upon application of pressurized fluid thereto. The arrangement is such that the valve assembly including both operating units may be readily disassembled for cleaning and inspection and then reassembled with the tank, and with the valve assembly being structurally reliable for handling the liquid contents of the tank.

22 Claims, 4 Drawing Sheets

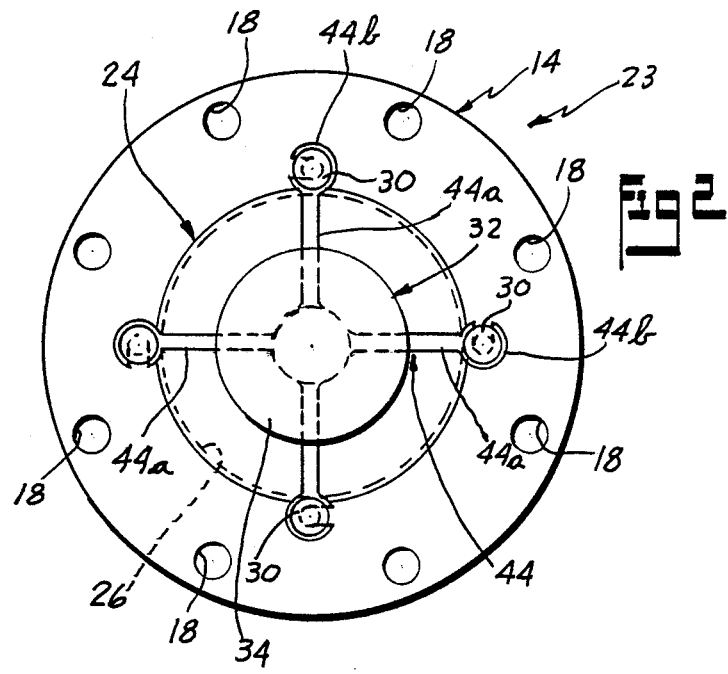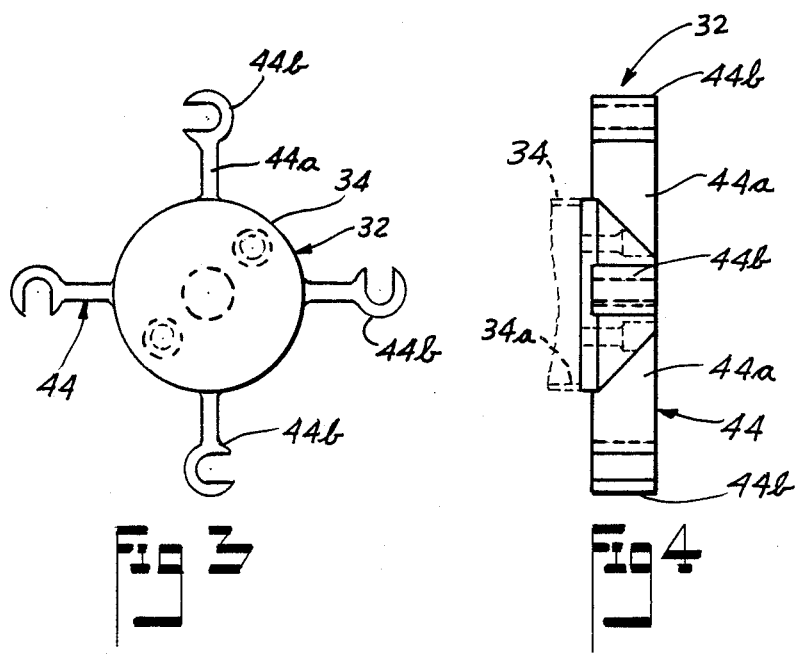

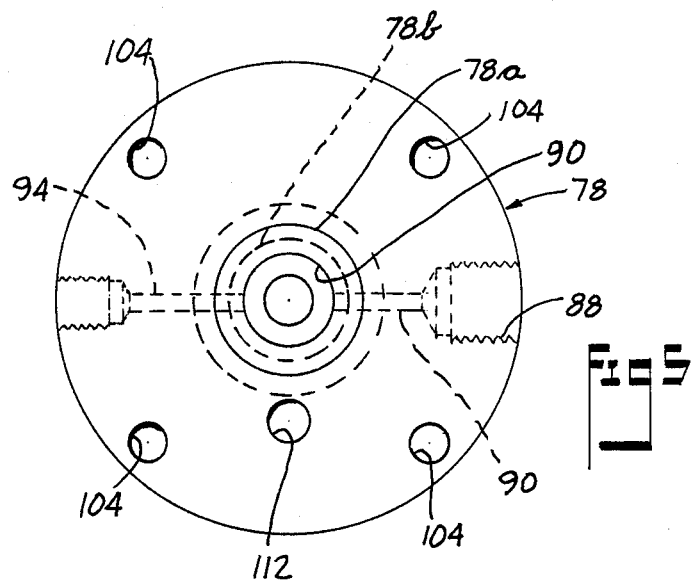
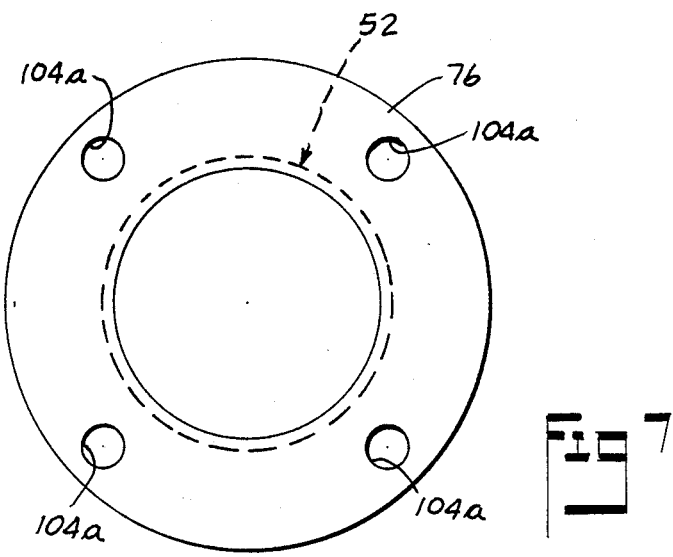

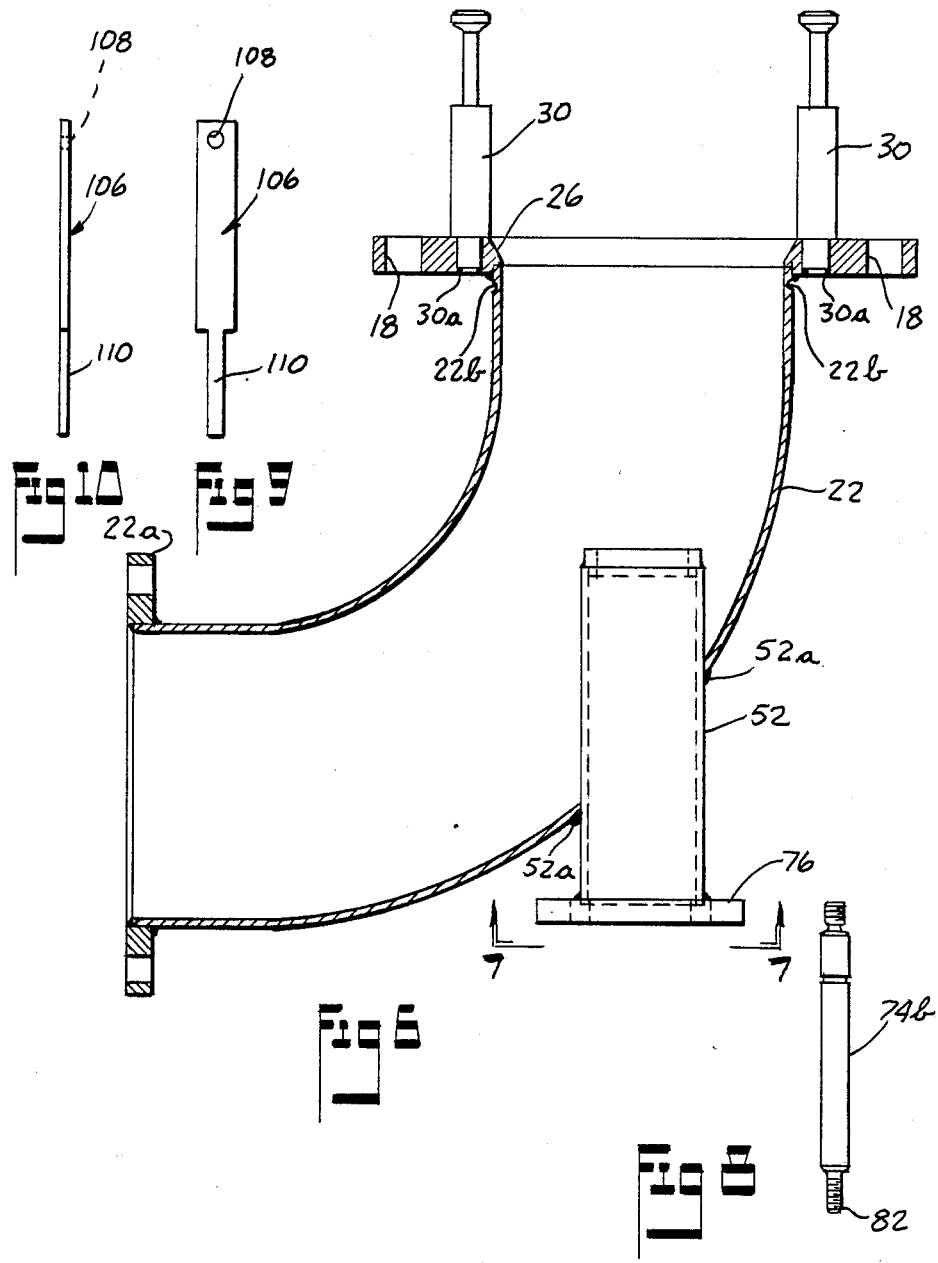

READILY INSPECTABLE AND CLEANABLE EMERGENCY VALVE FOR STORAGE TANK

This invention relates to a novel and improved valve particularly adapted for the control of liquid flow from a storage tank therefor, such as for instance a tank truck or trailer which may be used for transport of flammable and/or hazardous materials, as well as non-hazardous materials.

Valves of this general type are termed emergency valves and are customarily provided with means for preventing accidental or unintentional discharge of the liquid contents from the tank by providing for maintaining the valve in a closed condition, and especially in the event of accident or fire which may damage piping, or which may damage the tank structure, such as for instance in the event of a traffic accident involving a tank truck or tank trailer.

There is substantial volume in this country and abroad of transporting liquids such as chemicals both hazardous and non-hazardous, and flammable and non-flammable, in tank trucks or trailers, or the like, and therefore it is necessary to have a valve structure which not only reliably controls the contents of the containing tank, but also one that can be thoroughly cleaned after each load is carried by the associated tank, so as to avoid the possibility of load contamination. It is important therefore that any valve structure utilized with tank trucks or tank trailers, or the like, be susceptible to ready inspection, cleaning and associated expeditious disassembly and reassembly thereof.

Various arrangements of emergency valves have therefore evolved to attempt to alleviate the inspection and cleaning problems in connection with a tank or trailer truck, but none of such prior art valves are, to applicants' knowledge, as readily disassembleable and readily reassembleable as the present valve structure, which expedites the inspection and cleaning problems associated with valve structure of this type.

BACKGROUND OF THE INVENTION

U.S. Pat. No. 3,065,949 dated Nov. 27, 1962 to Joseph H. DeFrees and entitled Chemical Emergency Valve, discloses a type of emergency valve which attempts to provide greater simplification in the cleaning operation of the valve, with the latter being accomplished by presenting a valve structure wherein the working parts are enclosed, so as to be out of contact with the liquid being carried, charged or discharged from the tank.

Various other emergency type valves are known in the art, such as for instance U.S. Pat. No. 3,910,551 in the name of Joseph H. DeFrees issued Aug. 23, 1977; Canadian patent No. 654,932 in the name of Joseph H. DeFrees and issued Jan. 1, 1963 and entitled Bottom Loading Emergency Valve; and Canadian patent No. 654,916 dated Jan. 1, 1963 and entitled Chemical Emergency Valve. However, in all of these prior art valve assemblies, the disassembly, inspection and cleaning thereof represents quite a time consuming task and thus an undesirable situation in the operation of inspecting and cleaning the valves between loads so as to attempt to prevent contamination between such loads.

SUMMARY OF THE INVENTION

Accordingly, an object of the present invention is to provide a novel emergency valve structure which provides greater simplification in the inspection and cleaning operations involved therewith.

A further object of the invention is to provide a valve of the aforementioned type which includes a spring actuated operating unit for urging the valve head of the valve into a closed condition with respect to the associated valve seat, and a pressurized fluid actuated operating unit which is accessible from exteriorly of the associated tank, and operative to cause selective opening of the valve head with respect to the valve seat.

A still further object of the invention is to provide a valve of the aforedescribed type which includes means for providing for rapid and ready disassembly and reassembly of the valve head with respect to the valve seat from interiorly of the tank, and likewise providing for ready disassembly and reassembly of the fluid pressure valve operating means or operating unit from exteriorly of such operating unit and exteriorly of the associated tank, for inspection, cleaning and/or repairing thereof.

A still further object of the invention is to provide a valve of the aforementioned type which includes auxiliary means adapted for mechanical coaction with the fluid pressure operating unit, for manually actuating such operating unit to cause opening of the valve, without the necessity of applying pressurized fluid to such operating unit for actuation of the same.

Another object of the invention is to provide a valve of the aforementioned type wherein the spring actuated operating unit for the valve includes a spider member coacting with headed post members, and providing for urging of the valve head toward closed condition on the valve seat, and wherein the valve head can be disassembled from coaction with the valve seat by rotation of the spider member and associated spring operating unit relative to the headed posts and in a generally horizontal plane, so as to provide for expeditious inspection, cleaning and/or repairing thereof.

A still further object of the invention is to provide a valve of the aforementioned type wherein an operating unit for closing the valve head and the associated valve head, can be readily disassembled from coaction with the valve seat of the valve, from interiorly of the associated tank, and wherein a further separate operating unit for the valve head, for opening the latter, can be disassembled from exteriorly of the tank and exteriorly of the valve head, for ready and expeditious inspection, cleaning and/or repair thereof.

Other objects and advantages of the invention will be apparent from the following description taken in conjunction with the accompanying drawings wherein

BRIEF DESCRIPTION OF THE DRAWINGS

FIG. 2 is a top-plan view of the valve illustrated in FIG. 1, showing the spring actuated operating unit for the valve head which includes an associated spider member, facilitating ready removal of the operating unit and valve head from coaction with the valve seat for inspection, cleaning and/or repair thereof, and providing for ready reassembly with the valve seat after such inspection, cleaning and/or repair;

FIG. 3 is a top plan view of the spider member and attached spring operating unit illustrated in FIG. 2, but separated from the headed post structure of the FIG. 2 valve seat illustration;

FIG. 4 is a side elevational broken view of the spider member and associated operating unit(shown in phantom lines) taken from the right hand side of FIG. 3;

FIG. 5 is an enlarged top plan view of the flange member adapted for use in coupling the fluid pressure operating unit of the valve to a source of pressurized fluid, and which upon removal from the remainder of the fluid pressure operating unit enables ready disassembly of the interior mechanism of such operating unit, for inspection, cleaning and/or repair thereof;

FIG. 6 is an elevational sectional view of the subassembly (shown in FIG. 1) of the valve seat and associated post structure, the liquid conveying elbow, and the housing only of the fluid pressure operating unit, such housing being secured to the elbow and projecting interiorly and exteriorly thereof;

FIG. 7 is an enlarged, bottom plan view taken generally along the plane of line 7-7 of FIG. 6, looking in the direction of the arrows;

FIG. 8 is an elevational view of the piston stem of the piston unit of the fluid pressure operating unit, for the valve;

FIG. 9 is an enlarged, front elevational view of the hanger tie (illustrated in FIG. 1) for temporarily supporting the flange member (FIG. 5) of the fluid pressure operating unit on the housing thereof prior to the attachment of the threaded fastener means securing the flange member to the remainder of the fluid pressure operating unit; and FIG. 10 is a side elevational view of the FIG. 9 hanger tie, taken from the left hand side thereof.

DESCRIPTION OF PREFERRED EMBODIMENT

Figure 1:
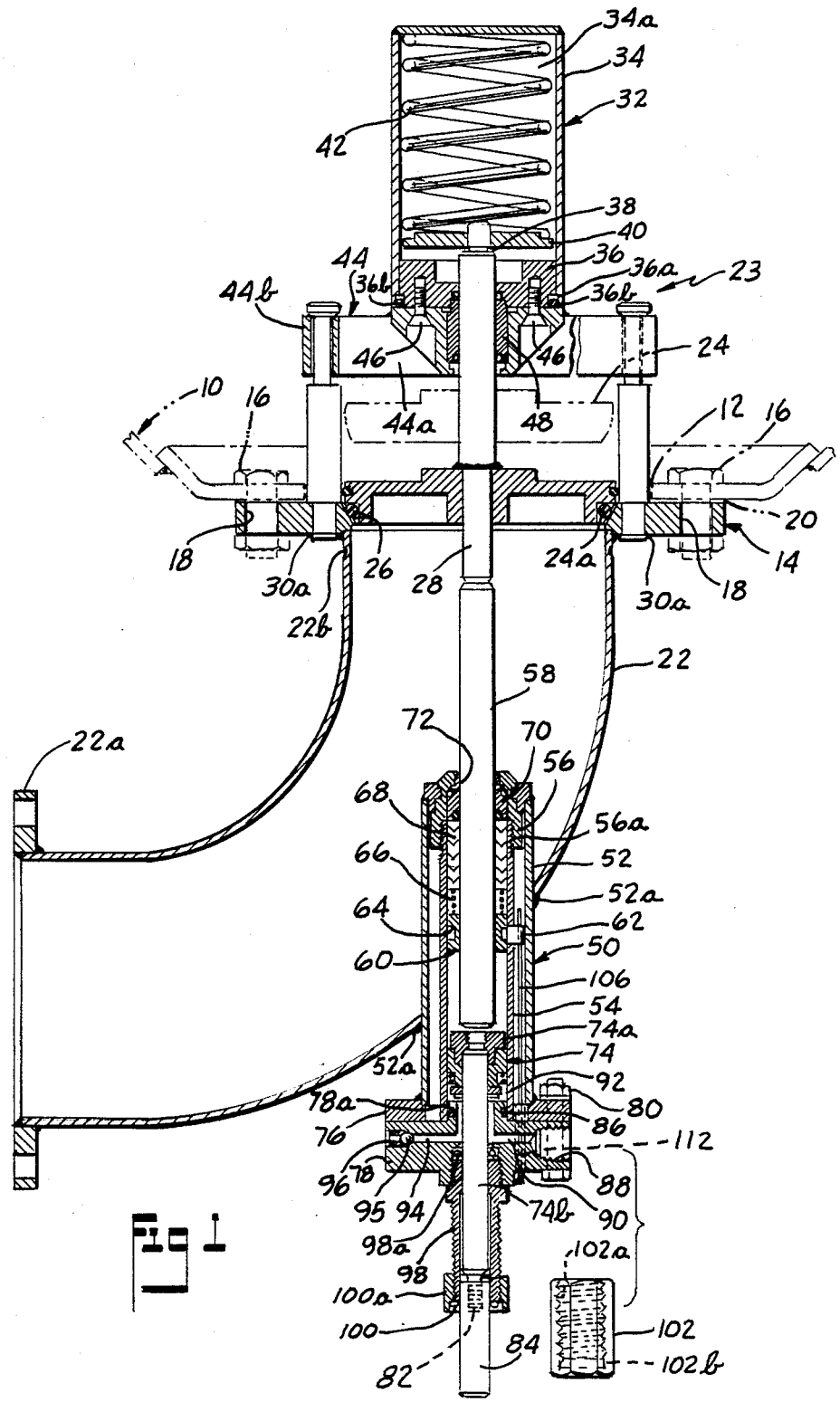
FIG. 1 is a sectioned, elevational view of an emergency valve embodying the invention; at the bottom portion of FIG. 1 there is shown an associated mechanical nut means which is adapted from manually actuating the pressurized fluid operating unit of the valve, to cause opening of the valve head without the necessity of applying pressurized fluid to such pressurized fluid operating unit; the phantom lines represent a tank in which the valve is mounted.

Referring now again to the drawings, and in particular to FIG. 1 thereof, there is shown, in phantom, a fragmentary portion 10 of the bottom wall of a liquid transportation tank, having an aperture 12 formed therein to the periphery of which is attached a valve seat 14, and as by means of threaded fasteners 16, passing through apertures in the tank 10 and aligned apertures 18 in the valve seat. A leak-proof gasket 20 is preferably provided between the seat 14 and the underside of tank 10. Seat 14 in the embodiment illustrated, supports a conduit elbow 22 thereon through which liquid may be discharged from and also directed into the tank, with the elbow having at its distal end a connection flange 22a adapted for attachment to other liquid carrying piping (not shown) conventionally associated with a liquid transporting tank 10. Shear groove 22b is preferably provided in elbow 22.

A valve assembly 23 which includes the aforementioned seat 14 and a coacting valve head member 24, is provided for closing the port 26 in the valve seat, with the head 24 preferably having a sealing means, (e.g. gasket or 0-ring) 24a associated therewith, for preventing leakage between the valve head 24 and the port 26 when the valve is in the full line closed condition, as illustrated for instance in FIG. 1.

In the embodiment illustrated, the valve head 24 includes a stem portion 28 secured thereto and extending both upwardly and downwardly from the seat closing area, for a purpose to be hereinafter discussed.

The valve seat 14 also includes in the embodiment illustrated, a plurality of headed post members 30, secured as by welds 30a to the valve seat, and projecting upwardly therefrom as illustrated in FIGS. 1 and 2.

A spring actuated operating unit 32 coacts with the valve head 24, to automatically normally urge the valve head 24 to a closed position with respect to port 26, and as illustrated in FIG. 1.

Operating unit 32 includes a housing 34 defining a closed chamber 34a, closed at its lower end by a preferably removable closure member 36 secured to housing 34 by retaining ring 36a, and which may also include sealing means 36 coacting between member 36, and the interior of the housing 34, for sealing the interior of the housing against ingress of liquid carried or transported in the tank 10.

As can be best seen from FIG. 1, the aforementioned stem 28 of the valve head 24 movably extends upwardly through the closure member 36, and into the housing chamber 34a and has on its upper end a shoulder 38, supporting a spring washer 40 and between which and the interior upper end of the housing 34, extends a coil spring 42, with the coil spring 42 being under predetermined compression so as to urge the stem 38 and associated valve head 24 downwardly toward a closed position with respect to port 26.

In accordance with the invention, the operating unit 32 includes a spider member 44 (FIGS. 1, 2, 3, and 4) which may be detachably connected by means of threaded fasteners 46 to the housing closure 36, with spider 44 including outwardly projecting arms 44a, which at their distal ends include claw portions 44b, with claw portions 44b being adapted to detachably coact with the aforementioned headed posts 30, for detachably holding the operating unit 32 in operative position on the headed posts of the valve seat 14, and thus hold the valve head 24 in its normally closed condition with respect to the port 26 in the valve seat 14.

It will be seen that by applying a downward vertical force to the operating unit 32, and then twisting the operating unit 32 including the associated spider 44 in a generally horizontal plane, the claw portions 44b can be readily detached from the headed posts 30, to permit removal of the operating unit 32 and associated valve head 24 from the valve seat for ready inspection, cleaning or repairing of the operating unit 32 and/or the valve seat and valve head members. Sealing means 48 coacting between the upper section of stem 28 and the central portion of spider 44 normally prevents leakage of liquid in the tank from entering the closed chamber 34a of operating unit 32. Thus it will be understood that the spring operating unit 32 including spider 44 can be readily separated from the valve seat 14 and from interiorly of the tank 10, for expeditious inspection and cleaning of the valve structure disposed within the tank.

A further pressurized fluid operating unit 50, which includes a means for applying pressurized fluid thereto for actuating the operating unit, is provided on the conduit or elbow 22 and is for the purpose of operating the valve head 24 from a remote location so as to open the valve head and permit for instance the discharge of the liquid contents in the tank 10, and to open the valve head, from the full line closed position illustrated in FIG. 1 to for instance the phantom line open position illustrated in FIG. 1, to permit discharge of the liquid contents in the tank, or to permit bottom loading of the tank in the conventional well-known manner.

Pressurized fluid actuated operating member 50 comprises a housing 52, which extends through the wall of duct 22 interiorly and exteriorly thereof and is secured to such wall in fluid sealed relationship, as by means of welds 52a.

Operating unit 50 includes a barrel member 54 disposed interiorly of housing 52, which includes in its upper end a barrel cap 56 preferably threaded thereto as at 56a, and with a shaft member 58 disposed in the barrel 54 and projecting upwardly therefrom and adapted for engagement with the underside of the lower portion of stem 28 attached to valve head 24.

It will be understood that shaft 58 is completely separate from stem 28, and upon disassembly of operating unit 50, as will be hereinafter described, the shaft 58 is pulled downwardly out of the barrel in housing 52.

A base member 60 may be provided in encircling relationship to shaft 58 with the base member being secured to the barrel 54 as by means of threaded set screws 62 which extend into a groove 64 encircling base 60, and a spring 66 may extend between the base unit 60 and a packing or sealing means 68 for sealing the shaft 58 in its axial movement with respect to the barrel 54 and associated housing 52.

0-ring carrier 70 may be positioned on the top of packing 68 between the barrel cap 56 and the shaft 58, and packing 72 may be likewise provided coacting with the upper end of the barrel cap for preventing the leakage of liquid contents in the tank 10 from seeping into the operating unit 50.

Disposed below the shaft 58 in barrel 54 is a piston unit 74 comprising piston head assembly 74a which is detachably connected to piston stem 74b, the latter extending downwardly from the bottom of the barrel 54 through the housing flange portion 76, secured as by means of welds, to the lower end of housing 52, and through the pressurized fluid inlet flange 78 which is secured as by means of threaded nut and bolt fasteners 80 to the aforementioned housing flange portion 76. The lower end of piston stem 74b can be threaded as at 82 (FIG. 1 and 8) and in the embodiment illustrated is shown as receiving in threaded coaction therewith an indicator rod 84, which enables visual indication of the position of the piston unit 74 in barrel 54 and with respect to the shaft 58.

Aforementioned inlet flange 78, in the embodiment illustrated, includes a central boss 78a (FIG. 5) which includes circumferential recess 78b therein receiving a sealing means such as an 0-ring 86 (FIG. 1) for sealing the inlet flange with respect to the associated barrel member 54. A pressurized fluid inlet port 88 is provided in inlet flange 78, which is adapted for connection as by means of a fluid pressure line (not shown) to a remote source of pressurized fluid, for applying pressurized fluid to the inlet flange 78 and thence through passageway 90 therein to a pressure chamber 92 in barrel 54, for actuating piston unit 74 and moving it upwardly in the barrel 54 against the shaft 58, thus causing upward movement of the shaft 58 and resultant movement of the valve head 24 from the closed position illustrated to an open position, such as for instance the phantom line position illustrated in FIG. 1.

Fluid pressure chamber 92 communicates with the passageway 94 in inlet flange 78 and may be provided with a ball type relief valve 95 therein which may be manually actuated both to open and closed conditions, for selectively bleeding the fluid pressure chamber upon application of fluid pressure to the entry port 88 to clear the pressure chamber 92 of air. It should be understood that by threading the actuator 96 of the relief valve 95 into or from its receiving cavity, the ball of the pressure relief valve 95 can be either disposed so as to close the passageway 94 or to open it for relief of fluid pressure in chamber 92.

Circumscribing the piston stem 74b and received in a socket on the underside of the inlet flange member 78, as by threading is an indicator guide member 98. A U-seal 98a can be provided coating between the indicator guide, the piston stem 74b and the inlet flange 78, for preventing leakage of pressurized fluid applied to the pressure chamber 92 via pressurized fluid inlet port 88.

Indicator guide 98 is preferably threaded on its exterior, as illustrated in FIG. 1, and is provided with a wiper scraper 100 and a wiper scraper nut 100a coacting with the indicator guide 98 in threaded relationship, and as shown in FIG. 1. The aforementioned indicator rod 84 projects downwardly from scraper 100 and associated nut 100a.

In order to be able to manually actuate the piston unit 74 to cause upward movement of the shaft 58, and thus opening of the valve head 24, in the event of failure of actuating pressure at port 88, there is preferably provided a screw jack nut 102, which is threaded as 102a on its interior and which is provided with an abutment 102b at the lower end thereof so that if a manual actuation of the piston unit 74 is desired, the wiper scraper nut 100a and associated wiper scraper 100, can be detached from the indicator guide 98 by unthreading thereof, and then the screw jack nut 102 can be threaded onto the threaded exterior of the indicator guide, with the indicator rod 84 being received in the jack nut 102 until the lower end of the indicator rod 84 engages the abutment 102b in the jack nut, whereupon further threading of the jack nut onto the indicator guide will cause mechanical lifting of the indicator rod and attached piston stem 74b, and thus actuation of the piston unit 74 to cause upward movement of shaft 58 which then applies pressure to the downwardly depending valve head stem 28, and thus cause lifting of the valve head 24 from seat 14 to open the port 26 in the seat member, and against the resistance to compression of spring 42 of operating unit 32.

Reverse rotation of the jack nut 102 will, of course, permit the spring 42 of operating unit 32, to return the valve head 24 to its normally closed position with respect to the discharge port 26 in the valve seat 14.

It will be seen that by removal of the threaded fasteners 80 extending through the receiving openings 104 in the inlet flange member 78 and in the aligned openings 104a in the end flange portion 76 of the associated housing member 52, the inlet flange member 78 can be dropped downwardly away from coaction with the housing flange, and resulting in exposure of the piston unit 74 and barrel 54 and ready removal of the piston unit 74 and barrel member 54 from the interior of housing 52, together with the removal of the shaft 58, for ready inspection, cleaning and/or repair of the operating unit 50. It will be seen that once the inlet flange 78 is removed and the barrel and piston unit and shaft 58 are removed, the only part of operating unit 50 still attached to the elbow 22 is the housing 52 which is secured by welds thereto, but which can be readily cleaned in the event that any of the liquid that has passed through the elbow 22 from or to the tank, has seeped into the operating unit 50.

Referring now to FIGS. 9 and 10, in conjunction with FIG. 1, it will be seen that there is preferably provided in the operating unit 50, a hanger means 106, which extends downwardly from the aforementioned threaded set screw 62 attaching the base 60 to the barrel 54 to be connected or coupled to the inlet flange 78, for holding the inlet flange suspended on the barrel 54 and thus on the operating unit 50, even when the fasteners 80 are removed, at which time the inlet flange 78 can be pulled or forced downwardly away from the underside of the operating unit 50.

In this connection, the hanger member 106 includes an opening 108 therein, through which is received one of the set screw members 62 aforementioned to secure the hanger 106 to the base 60, and a reduced size leg portion 110 which is adapted to be received through an opening 112 (FIG. 5) in the inlet flange 78, so as to permit the leg portion 110 to pass through the inlet flange 78 and be bent beneath flange 78 to hold the inlet flange suspended from the barrel 54 via the hanger 106, even though the fasteners 80 have been removed. This, of course, facilitates not only the removal of the inlet flange 78 from its fastened coaction with the housing flange portion 76 but also facilitates the reassembly of the inlet flange to the housing flange after the inspection and/or cleaning or repairing of the operating unit 50 has been accomplished.

From the foregoing description and accompanying drawings it will be seen that the invention provides a novel emergency valve assembly for a tank adapted to contain liquid contents, such as for instance, hazardous materials, with the valve assembly including a valve head for closing a discharge port from the tank in an operative closed position of the valve head and including a first operating unit coacting with the valve head for opening the latter, and a second operating unit coacting with the valve head for automatically closing the latter. The valve assembly provides for expeditious inspection, repair and/or cleaning of the valve assembly by having both operating units readily disassembleable from coaction with the valve head, and after inspection, cleaning and/or repair thereof, such operating units can be readily reassembled with the valve head for again controlling the flow of liquid from the tank.

One of the operating units for the valve head is a spring operated operating unit for automatically urging the valve head toward closed position while the other operating unit for the valve head is a pressurized fluid operating unit which enables opening of the valve head from a location remote therefrom. Means is provided for mechanically or manually actuating the pressurized fluid operated operating unit in the event of failure of the pressurized fluid system, and means are also provided on the valve assembly for visually indicating the position of the piston unit of the pressurized fluid actuated operating unit, so as to provide for visual indication of an existing position of the piston unit of the operating unit.

The terms and expressions which have been used are used as terms of description and not of limitation, and there is no intention in the use of such terms and expressions of excluding any equivalent of any of the features shown or described, or portions thereof, and it is recognized that various modifications are possible within the scope of the invention claimed.

We claim:

1. An emergency valve for a tank adapted to contain liquid, said valve being adapted for assembly with the tank for enabling selective control of the discharge of liquid contents from the tank, said valve including a valve head and a coacting seat for closing a discharge port from the tank when said head is in operative closed position with respect to said seat, and a generally vertically oriented operating unit generally aligned with said seat and being totally separate from said head but coacting with said head from below the latter in non-attached relationship for operating said head to move it from a closed position to an open position, said operating unit including an upwardly operable fluid powered piston unit, and also having a downwardly projecting portion providing accessibility to said operating unit from exteriorly of the tank, and also including means on said portion for coupling said operation unit to a source of liquid power, the latter being adapted for causing selective fluid powered actuation of said piston unit of said operating unit and thus opening of said valve head from a remote location with respect to said valve head, the first mentioned means including means providing for ready disassembly and reassembly of the first mentioned means from and to the remainder of said operating unit whereby said operation unit including said piston unit can be readily separated from said head and disassembled downwardly from exteriorly of said operating unit when mounted on an associated tank, for inspection, cleaning and/or repairing of said operating unit, and other means coacting with said valve head and said valve seat from above the latter, and providing for rapid and ready disassembly and reassembly of said valve head with respect to said valve seat, whereby said valve can be readily disassembled for inspection, cleaning and/or repair and then can be readily reassembled for use.

2. A valve in accordance with claim 1 wherein said seat includes an elbow extending therefrom and communicating with said seat, said operating unit being mounted on said elbow and extending both interiorly into and exteriorly from said elbow in generally vertical alignment with said seat, the first mentioned means being on said portion of said operating unit, which extends exteriorly from said elbow.

3. A valve in accordance with claim 1 including means adapted for mechanical coaction with said operating unit for manually actuating the latter to cause opening of said valve, without the necessity of applying pressurized fluid to said operating unit for actuation of the same.

4. A valve in accordance with claim 1 wherein said operating unit includes a housing extending into an associated discharge duct adapted for coupling to the tank in communication with the discharge port of the tank, with said housing extending through the defining wall of said discharge duct in fluid tight relationship and also extending from the exterior of said duct, and wherein said first mentioned means is attached to said housing exteriorly of said duct for ready accessibility thereto.

5. A valve in accordance with claim 2 wherein said operating unit includes a housing and a barrel disposed within said housing, a shaft disposed within said barrel and projecting therefrom and upwardly from said housing, said shaft ring separate from said valve head but being adapted for engagement with said valve head for opening the latter upon said actuation of said operating unit, means sealing said shaft with respect to said barrel while permitting axial movement of said shaft relative to said barrel, said piston unit disposed within said barrel and being adapted for communication with the first mentioned means for power actuation of said operating unit, so that upon application of pressurized fluid to said piston unit, said piston unit will cause upward outward movement of said shaft relative to said barrel and engagement of said shaft with said valve head, and thus cause opening of said valve head.

6. A valve in accordance with claim 5 wherein said piston unit includes a piston stem projecting outwardly of said barrel and through said coupling means, and manual actuating means exteriorly accessible relative to said coupling means, for mechanically applying pressure to said piston stem upon actuation of said manual actuating means, for activating said piston unit by mechanical force and thus causing said opening of said valve head.

7. A valve in accordance with claim 6 wherein said manual actuating means comprises a threaded stud portion coupled to said operating unit in generally encompassing relation to said piston stem, and a deep depth nut adapted for threaded coaction with said threaded stud portion, said nut having means thereon adapted for engagement with the distal projecting end of said piston stem and upon threading of said nut on said threaded stud portion, causing forced inward movement of said piston stem relative to said barrel and thus causing actuation of said piston unit and associated outward movement of said shaft relative to said barrel, for engagement with said valve head to cause said opening of the latter.

8. A valve in accordance with claim 7 including sealing means coacting with said piston stem for preventing leakage from said operating unit, of pressurized fluid applied to said operating unit for activating the latter.

9. A valve in accordance with claim 7 wherein said means providing for ready disassembly and reassembly of said first mentioned means from and to the remainder of said operating unit comprises threaded fasteners and wherein said barrel is completely open at the bottom thereof for withdrawal movement of said piston unit from said barrel upon disassembly of said coupling means from said operating unit, for cleaning and/or repairing said operating unit, said barrel being removable through the open bottom end of said housing upon disassembly of said first mentioned means from said housing.

10. A valve in accordance with claim 5 including a base in said barrel encircling said shift, a spring coacting between said base and said sealing mean for aiding in maintaining sealing of the shaft with respect to said housing and said barrel, while permitting lengthwise movement of said shaft relative to said housing and said barrel, and means coacting between said base and said barrel for detachedly locking said base in predetermined position relative to said barrel.

11. A valve in accordance with claim 10 including hanger means coacting between said locking means and said coupling means for suspending said coupling means on said housing and said barrel prior to application of fastener means to said coupling means to detachably secure the latter to said housing, said fastener means comprising said means providing for ready disassembly and reassembly of the first mentioned means from and to the remainder of said operating unit.

12. A valve in accordance with claim 6 wherein said first mentioned means comprises a flange member having an entry portion therein for coupling to an associated source of pressurized fluid with said flange member including a projecting embossment thereon adapted to be received within the interior of said barrel at a bottom end thereof in locating relation, sealing means coacting between said embossment and the interior surface of said barrel for sealing the flange member relative to the interior of said barrel, and said means providing for ready disassembly and reassembly of the first mentioned means comprising fasteners and complementary receiving openings on said flange member coacting between said housing and said flange member and detachably securing said first mentioned means to said housing.

13. A valve in accordance with claim 12 including relief passageway means in said flange member coacting with a pressure chamber in the lower end portion of said barrel and including a relief valve in said passageway means adapted for manual actuation, for selectively bleeding the fluid pressure chamber upon initial application of pressurized fluid to said chamber via said entry port.

14. A valve in accordance with claim 1 wherein said other means includes means coacting with said seat and adapted for positioning in the interior of an associated tank, for detachably coupling said valve head in the tank to and from said seat for inspection, and cleaning of the valve.

15. A valve in accordance with claim 14 including a spring operating unit coacting with said valve head, the last mentioned operating unit comprising a housing and a spring coacting between the housing and the valve head for urging the valve head toward said closed position on said seat.

16. A valve in accordance with claim 14 wherein the last mentioned means includes a further valve operating unit comprising a housing containing a spring and a spider portion disposed in sealed relation to the lower end of said housing and coacting with headed posts extending upwardly about said seat and detachably coupling said valve head to said seat.

17. A valve in accordance with claim 16 wherein said spider portion has distal claw portions, said claw portions being adapted to releasably coact with said headed posts projecting upwardly from said valve seat, said spider portion being spring loaded by said further operating unit and so as to urge said valve head toward said valve seat but providing for rotative movement of said further operating unit including said spider portion with respect to said headed posts in a generally horizontal plane, so as to detach said further operating unit including said spider portion from coaction with said headed posts, and thus permit disassembly of said valve head from coaction with said valve seat.

18. A valve in accordance with claim 17 wherein said valve head coacting with said valve seat for closing the discharge opening in the tank has a stem portion projecting downwardly therefrom adapted for engagement with the first mentioned operating unit for causing opening of said valve head upon application of pressurized operating fluid to said first mentioned operating unit, and wherein said valve seat includes means for detachably coupling said valve seat and associated headed posts to an associated tank.

19. An emergency valve for a tank adapted to contain liquid, said valve being adapted for assembly with the tank for enabling selective control of the discharge of liquid contents from the tank, said valve including a valve head and a coacting seat for closing a discharge port from the tank when said head is in operative closed position with respect to said seat, and an operating unit generally aligned with said seat from below the latter and being totally separate from said head but coacting with said head in a non-attached relationship for operating said head to move it from a closed position to an open position, said operating unit having a portion thereof providing accessibility from exteriorly of the tank and including means on said portion for coupling said operating unit to a source of fluid power, the latter being adapted for causing selective actuation of said operating unit and thus opening of said valve head from a remote location with respect to said valve head, the first mentioned means including means providing for ready disassembly and reassembly of said first mentioned means from and to the remainder of said operating unit whereby said operating unit can be readily separated from said head and disassembled from exteriorly of said operating unit when mounted on an associated tank, for inspection, cleaning and/or repairing of said operating unit upon disassembly of said first mentioned means, said operating unit including a housing and a barrel disposed within said housing, a shaft disposed within said barrel and projecting upwardly therefrom and from said housing, said shaft being separate from said valve head but being adapted for engagement with said valve head for opening the latter upon said actuation of said operating unit, means sealing said shaft with respect to said barrel while permitting axial movement of said shaft relative to said barrel, and a piston unit disposed within said barrel and adapted for communication with the first mentioned means for power actuation of said operating unit so that upon application of pressurized fluid to said piston unit, said piston unit will cause outward movement of said shaft relative to said barrel and engagement thereof with said valve head and thus cause opening of said valve head and including means for visually indicating from exteriorly of said operating unit the position of said piston unit in said barrel and with respect to said shaft.

20. An emergency valve for a tank adapted to contain liquid, said valve being adapted for assembly with the tank for enabling selective control of the discharge of liquid contents from the tank, said valve including a valve head and coacting seat for closing a discharge port from the tank when said head is in operative closed position with respect to said seat, and an operating unit generally aligned with said seat from below the latter and being totally separate from said head but coacting with said head in non-attached relationship for operating said head to move it from a closed position to an open position, said operating unit having a portion thereof providing accessibility thereto from exteriorly of the tank and including means on said portion for coupling said operating unit to a source of fluid power, the latter being adapted for causing selective actuation of said operating unit and thus opening of said valve head from a remote location with respect to said valve head, and means providing for rapid and ready disassembly and reassembly of said valve had with respect to said valve seat, whereby said valve can be readily disassembled for inspection, cleaning and/or repair and then can be readily reassembled for use, the last mentioned means including means coacting with said valve head and said seat and adapted for positioning in the interior of an associated tank for detachably coupling said valve head in the tank to and from said seat for inspection and cleaning of the valve, and including a spring operating unit coacting with said valve head, the last mentioned operating unit being disposed above said valve head and comprising a housing and a spring in said housing coacting between said housing and said valve head, for urging sid valve head towrd said closed position on said seat, said last mentioned operating unit also including a removable spider coupling means sealingly disposed in the lower end of said housing and coacting in holding relation with headed post members projecting upwardly relative to said seat, and said last mentioned operating unit and spider coupling means being rotatably releasable from said post members for providing easy accessibility to said valve head within the tank.

21. A valve in accordance with claim 20 wherein said valve head includes an upwardly projecting stem, said spring coacting between said housing and said stem, to urge said valve head toward said closed position, said last mentioned operating unit including a removable lower closure member for said housing, said closure member proving for lengthwise movement of said valve head stem therethrough and into said coaction with said spring, sealing means coacting between said stem and said closure member for sealing the interior of said housing of said last mentioned operating unit relative to the axially movable head stem, and means detachably coupling said spider coupling means to said closure member.

22. A valve in accordance with claim 21 wherein said valve head stem include a shoulder on the upper end thereof, a spring washer positioned on said shoulder, and said spring coacting between said spring washer and the interior of the top wall of said housing so as to urge said valve head stem and associated valve head downwardly into said closed position relative to said valve seat.

* * * * *